United States Patent
Lafitte

[15] 3,683,692
[45] Aug. 15, 1972

[54] PROCESS AND APPARATUS TO CALCULATE AND MEASURE THE FLOW OF A GASEOUS FLUID

[72] Inventor: Rene J. Lafitte, 87 rue de Falaise, Caen, Calvados, France

[22] Filed: Jan. 7, 1971

[21] Appl. No.: 104,664

[30] Foreign Application Priority Data

Jan. 8, 1970 France...................7000516

[52] U.S. Cl..................................................73/204
[51] Int. Cl..............................G01f 1/00, G01p 5/10
[58] Field of Search..................................73/204

[56] References Cited

UNITED STATES PATENTS

| | | | |
|---|---|---|---|
| 3,326,040 | 6/1967 | Walsh | 73/204 |
| 3,085,431 | 4/1963 | Yerman et al. | 73/204 |
| 2,591,195 | 4/1952 | Picciano | 73/204 |
| 3,433,069 | 3/1969 | Trageser | 73/204 |
| 3,559,482 | 2/1971 | Baker et al. | 73/204 |
| 2,972,885 | 2/1961 | Laub | 73/204 |

Primary Examiner—Richard C. Queisser
Assistant Examiner—Herbert Goldstein
Attorney—Woodhams, Blanchard & Flynn

[57] ABSTRACT

An apparatus to compute and measure the flow of a gaseous fluid by measuring the quantity of heat necessary to raise the temperature of the fluid comprising a sensing means disposed in the gaseous flow and a reference means disposed in a dead end cavity in such a manner as to be insensitive to the flow of fluid.

10 Claims, 6 Drawing Figures

Patented Aug. 15, 1972
3,683,692
2 Sheets-Sheet 1
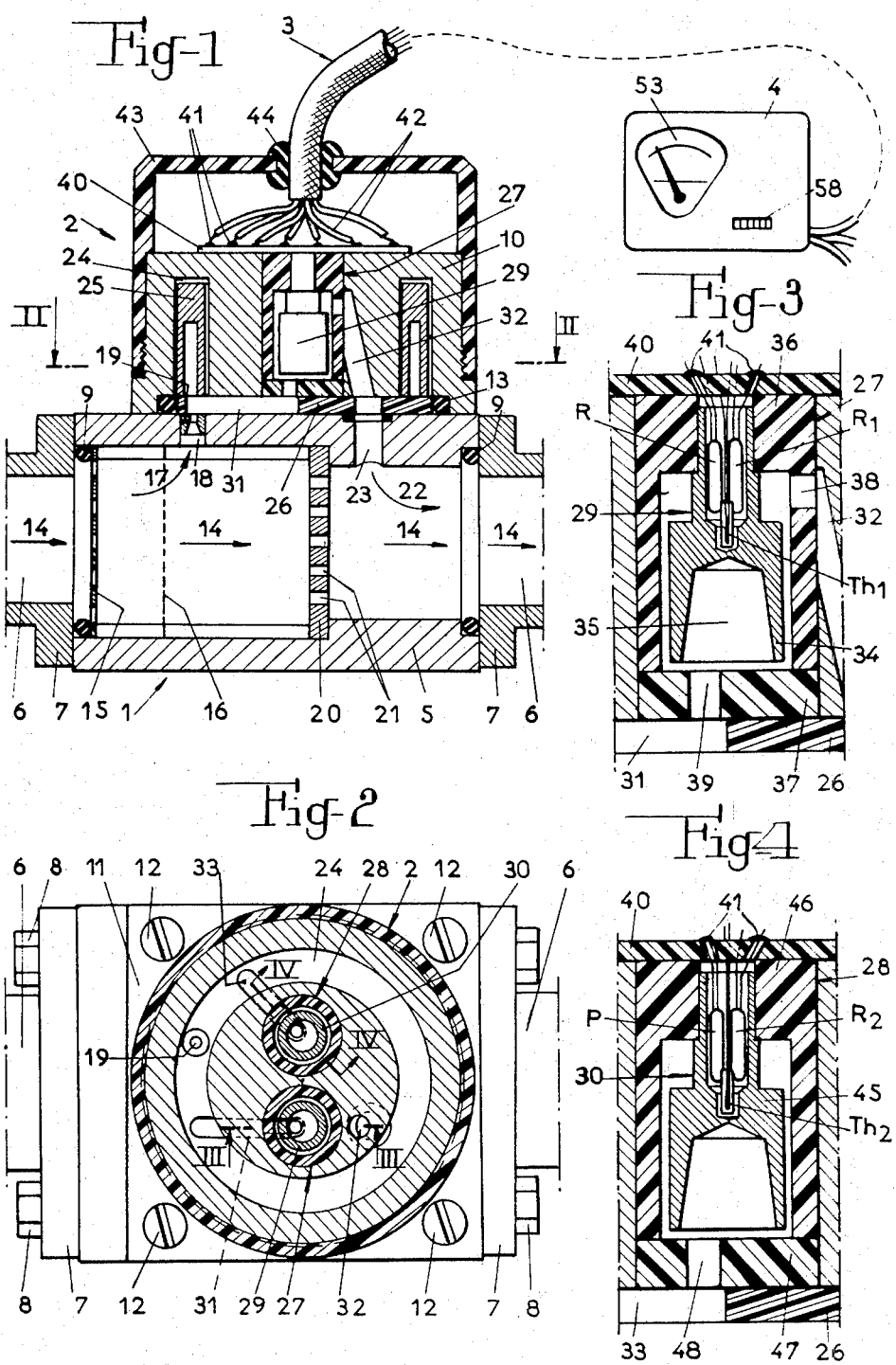
INVENTOR
RENÉ J. LAFITTE
BY
Woodhams, Blanchard & Flynn
ATTORNEYS

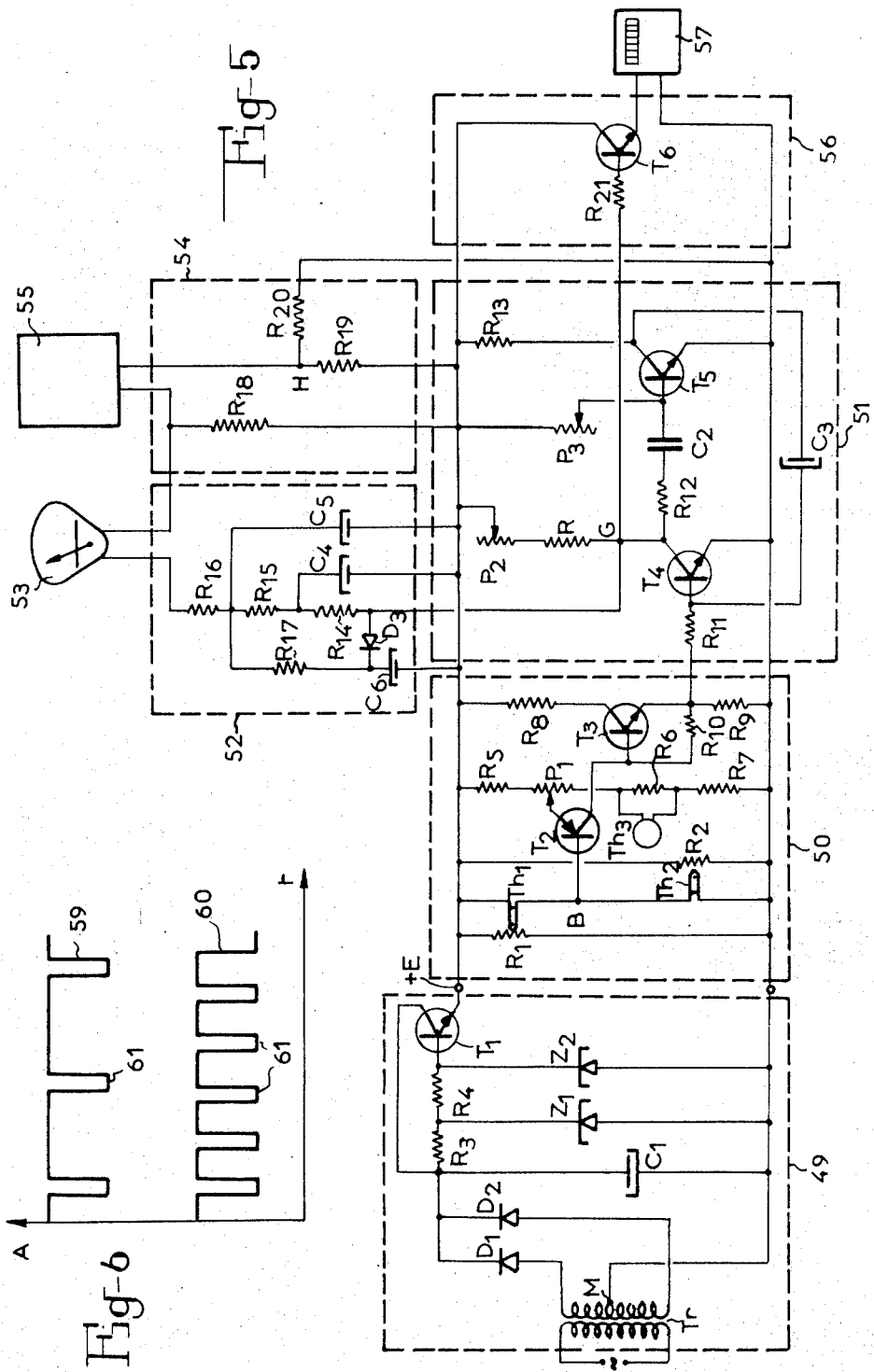

PROCESS AND APPARATUS TO CALCULATE AND MEASURE THE FLOW OF A GASEOUS FLUID

The present invention concerns an apparatus to compute and measure the flow of a gaseous fluid by measuring the quantity of heat necessary to raise the temperature of the fluid of a given quantity, comprising a sensing means disposed in the gaseous flow and a reference means disposed in a dead-end cavity in such a manner as to be insensitive to the flow of this fluid.

Such apparatus are known under the name of thermic flow meters and they offer, with reference to other types of flow meters, the advantage of giving an indication independent of the pressure and of the temperature of the fluids, since the specific heat of a gas does not depend upon these two factors. However, none of these apparatuses up to the present time has produced a truly satisfactory industrial embodiment, principally by reason of their complexity.

An object of the present invention is to remedy this inconvenience and, in order to do this, the invention provides an apparatus of the above-mentioned type which is characterized essentially in that each of the sensing means and the reference means comprise a heating resistor to continually heat the fluid in order to raise its temperature to a given quantity and a detecting element sensitive to the temperature, the sensing means also including a further heating resistor, hereinafter termed a heat compensating resistor, for which the current supply is regulated by the lack of balance between the two detection elements, for maintaining the said elevation of temperature of the fluid flowing past the sensing means, and means to continually measure the amount of current passing through this heat compensating resistance.

Thus, the apparatus is practically insensitive to variations in the ambient temperature, since the supply of current to the heat compensating resistor is controlled by the difference of the temperature existing between the sensing means and the reference means which is not subject in the fluid flow. Moreover, as the fluid flow increases, the heat supplied by the heat compensating resistor increases, so that the temperature of the sensing means remains identical to that of the reference means. The dissipation of electrical energy in this heat compensating resistor is thus really proportional to the fluid flow.

It can likewise be noted that the phenomena set in action being purely thermic, the apparatus is comprised of no movable parts and it is thus of great strength and practically unbreakable. It is easily seen, in addition, that such an apparatus would be insensitive to water hammer or to accidental peak flows.

In a particular embodiment of the invention in which the sensing means and the reference means are both incorporated in a measuring head, of which the body is fixed to a divider block of tubular flow, inserted into the pipeline through which passes the gaseous fluid for which one desires to measure the flow, this flow divider block communicating with a measuring head, on the one hand by an entry port and on the other hand by a discharge port by which the gaseous fluid proceeding from the measuring head rejoins the principal flow, the entry port of the gaseous flow proceeding into the measuring head is furnished with calibrated discharge pipe, whereas the flow divider block comprises between the intake opening and the corresponding discharge opening, a removable transverse plate provided with calibrated perforations.

Due to this assembled arrangement, large flows are measured by the means of a fraction of the principal flow which is directed toward the measuring head. One can thus measure, with a single measuring head, widely varying flows by simply modifying the ratio between the passage section of the outlet pipe and of the perforated plate.

Advantageously, the flow divider block comprises moreover a perforated grill and a screen, disposed transversely upstream of the intake opening of the gaseous flow proceeding into the measuring head.

The perforated grill has for its object to equalize the eventual turbulence of the gaseous flow, while the screen subdues these turbulences and stops the large particles which could be found in suspension in the gas.

The reference means and the sensing means are essentially comprised of two identical metallic probes in the form of bells, each comprising a hole in which are respectively disposed, in a metallic alloy, the heating resistor and the detecting element for the reference means and the heating resistance, the detecting element and the heat compensating resistance for the sensing means, an artificial resistance, of the same nature as the heat compensating resistance of the sensing means being moreover immersed in a corresponding hole of the probe of the reference means, in such manner that the loss of heat by thermic conduction should be identical for the two means.

The intake opening of gaseous flow derived empties into a practically annular chamber in the body of the measuring head, a calibrated outlet pipe equipping the input opening and being of very reduced diameter so that the gaseous flow derived ought to be actuated by the turbulent movement into the cavity of the said chamber.

Moreover, a hollow ring, thermally insulated, is disposed in the interior of the annular chamber, so that the fluid takes on the temperature of this ring, which ring changes temperature with the same thermal phase shift as the probe of the sensing means.

The cavity of the ring communicates at its inner part with a first cavity in the recess in which is disposed the reference means and with a second similar cavity in which is disposed the sensing means, this second cavity communicating moreover at its upper part with a conduit joined directly with the discharge port of the derived gaseous flow.

Thus, the gaseous flow has time to reach the ambient temperature of the measuring head before entering into the interior of the cavity in which is located the sensing means.

Advantageously, the interior walls of the two cavities in which are respectively located the reference means and the sensing means, are coated with a thermal insulating material such as the plastic material, in order to limit thermal transfer between the two means and the body of the measuring head.

In a preferred embodiment of the invention in which the two elements of detection sensitive to the temperature of gaseous fluid are constituted by thermistors connected into two adjacent brances of a Wheatstone Bridge, the unbalanced current is amplified and controls the functioning of a monostable multivibrator supplying the heat compensating resistor of the sensing means, the means which permit continuing measurement of the current traversing the heat compensating resistance being constituted by a milliammeter connected in parallel with said resistance by means of a filter circuit.

Thus, the intensity of the unbalanced current in the bridge determines the frequency of changing the state of the monostable multivibrator and, consequently, the frequency of the impulses which are delivered by this multivibrator to the heat compensating resistor. Moreover, the unbalanced current will be intense and further the frequency will be elevated, which produces in the heat compensating resistor a current intensity average much greater, and thus a larger heating of the latter. Besides, due to the filter circuit, the current which passes in the milliammeter is practically continuous and it is proportional to the frequency of the impulses delivered by the monostable device, and thus proportional to the heating power of the heat compensating resistor which is supplied by the same impulses.

Preferably, the apparatus comprises moreover an impulse counter, controlled by the monostable multivibrator and acting as a count accumulating device registering an integration of the fluid flow.

The counter has a consummation equivalent to that of the heat compensating resistor and is supplied in phase opposition with regard to that resistor, so as to assure a constant drain on the power supply, regardless of the fluid flow.

The counter registers thus the total quantity of gas which passes through the measuring head, by totalling the number of impulses delivered by the monostable multivibrator. MOreover, as it is supplied in phase opposition, and it is arranged so that it consumes very nearly the same current as the heat compensating resistance, the current delivered from the supply will be practically constant, for contributing thus to a good stabilization of a regulated voltage.

One embodiment of the invention is described hereinafter by way of example and with reference to the attached drawings in which:

FIG. 1 is a sectional view of an apparatus according to the invention, in which is schematically shown the case containing the electronic circuit for measuring which is associated with this apparatus;

FIG. 2 is a sectional view taken along the line II—II of FIG. 1;

FIG. 3 is an enlarged, fragmentary, sectional view taken along the line III—III of FIG. 2;

FIG. 4 is an enlarged, fragmentary view taken along the line IV—IV in FIG. 2;

FIG. 5 is a schematic diagram of the electronic circuit of measurement associated with the apparatus according to the invention; and FIG. 6 is a diagram representing, as a function of time and amplitude, the direction of the potential at a point in the circuit of FIG. 5, for two different values of the flow of fluid measured.

The apparatus represented in FIGS. 1 and 2 is comprised principally of a flow divider block 1 and of a measuring head 2 which is attached by an electrical cable 3 to a case 4 containing the associated electronic measuring circuit.

The flow divider block 1 is essentially comprised of a tubular metallic body 5 which is inserted into a pipeline 6, through which passes the gaseous fluid for which it is desired to measure the flow, by means of flanges 7 on which support is taken by the bolts 8. Sealing between the body 5 and the flanges 7 is secured by two O-rings 9. As to the measuring head 2, it is essentially comprised of a cylindrical, metallic body 10 which is affixed by its rectangular base to the body 5 of the flow divider block 1 by means of four screws 12, a seal being assured by an O-ring or sealing element 13.

The gaseous fluid flows through the pipeline 6 in the direction indicated by the arrows 14 and first encounters successively a perforated grill 15 and a metallic screen 16, mounted in the interior of the tubular body 5, and transversely thereof. The gaseous fluid then divides into two different circuits. One small part of this fluid is directed into the measuring head 2, as indicated by the arrows 17 in FIG. 1, by means of an entrance opening 18 provided in the wall of the body 5 and which is furnished with a calibrated delivery pipe 19. The rest of the fluid, which constitutes the major part thereof, passes directly through the flow divider block 1 by means of a plate 20 having a certain number of calibrated perforations 21. This perforated plate 20 is mounted in a removable manner in the interior of the tubular body 5, in the central part thereof. As indicated by the arrow 22, the gas flow proceeding through the measuring head 2 rejoins the principal flow which passes through the flow divider block 1, by a discharge opening 23 constructed in the wall of the tubular body 5 and emptying into the interior thereof on the other side of the perforated plate 20. In the interior of the cylindrical body 10 and the measuring head 2 is arranged an annular, peripheral chamber 24 into which discharges the opening of the calibrated delivery pipe 19. In this annular chamber is located a hollow ring 25.

Between the body 10 and the divider 1 is located a thermic isolating disk 26, for example, of plastic material, having some openings assuring the passage of the fluid therethrough.

In the central part of the body 10 are also arranged two cylindrical cavities 27 and 28 containing respectively a sensing means or element 29 and a reference means or element 30. The cavity 27 communicates at its lower part with the annular chamber 24 by the opening 31 and communicates at its upper part with a passage 32 connected to the discharge opening 23. The cavity 28 is a cavity in recess and only communicates with the annular chamber 24 by the single lower opening 33.

The sensing means 29 which is represented in a larger scale in FIG. 3, is essentially comprised of a metallic probe 34 having in its lower part a cavity 35 in the form of a bell, the probe is thermally isolated from the walls of the cavity 27 by means of a ring 36 and a disk 37, formed from plastic material. The ring 36 is furnished with a passageway 38 on a level with and communicating with the conduit 32, whereas the disk 37 is furnished with a passageway 39 adjacent and communicating with the opening 31.

At the upper part of the probe 34 is arranged an axial opening in the interior of which are immersed, for example, in a metallic alloy having a low point of fusion, a miniature thermistor Th 1, a miniature resistance R1, called the permanent heater and a miniature resistance R, called the compensating heater or heat compensating resistor. These three elements are part of the electronic measuring circuit associated with the apparatus and they are electrically connected to the remainder of the circuit, contained in the measuring case 4, here by means of a small printed circuit plate 40 including terminals 41 to which are soldered the extremities of corresponding conductors 42, constituting the connecting cables 3. This printed circuit plate 40 is disposed on the top of the body 10 and it is protected from external influences by a cover of plastic material 43 which is threadedly engaged with the periphery of the cylindrical body 10 while completely enclosing it. The connecting cable 3 passes through the cover 43 by means of an opening provided for this purpose in the upper part of the cover and which is equipped with an insulating grommet 44.

The reference means 30, which is shown in enlarged scale in FIG. 4, is essentially comprised of a metallic probe 45 in all respects identical to the probe 34 of the sensing means 29. This probe is also thermally isolated from the walls of the cavity 28 by a ring 46 and a disk 47 made from metallic material. The disk 47 is furnished with a passageway 48 adjacent to the opening 33, whereas the ring 46 is deprived of all passageways, being in the dead-end cavity 28.

At the interior of the axial opening provided in the upper part of the probe 45 are inserted a miniature thermistor Th 2, a miniature resistor R2, called the constant heater, and a provisional resistor P. The thermistor Th 2 and the resistor R2 are also necessary parts of the associated electronic circuit and they are connected electrically into the measuring case 4 by means of the above-mentioned printed circuit plate 40. The provisional resistor P is short-circuited and thus plays no role in the functioning of the associated electronic circuit. It simply occupies the place of the resistance R of the sensing means 29 and has for its purpose to render the reference means 30 perfectly identical to the sensing means 29 from the standpoint of geometric and thermal identity.

The associated electronic circuit, of which the schematic is shown in FIG. 5, is comprised principally of a stabilized supply 49, of a circuit 50 comprising a measuring bridge associated by an amplifier with transistors of a circuit 51 comprising a monostable multivibrator, two resistor of a measuring circuit 52 associated with a milliammeter 53, of a recording circuit 54 associated with a recorder 55 and of a control circuit 56 for an impulse counter 57.

The stabilized supply 49 is of a known type and comprises first a transformer Tr on the primary side of which is applied the alternating current of an A.C. source. The secondary coil of this transformer has a center tap M constituting the zero or reference level of the supply and its two extremities are respectively connected to two diodes D1 and D2 for providing full-wave rectified current. The stabilized supply 49 further includes a filter condenser C1, two Zener diodes Z1 and Z1 connected respectively in series with the resistances R3 and R4 across the condenser C2, and a regulation transistor T1, of the type NPN, connected as the supply output device. The positive potential, + E, appearing on the emitter of transistor T1 is thus perfectly stabilized and constitutes the supply voltage of the complete electronic circuit.

In the circuit 50 is found first of all the resistance R1 and the thermistor Th 1 of the sensing device 29, as well as the resistance R2 and the thermistor Th 2 of the reference device 30. Each of the resistors R1, R2 is directly connected between the emitter of the transistor T1 and the midpoint M, that is to say in parallel with the supply. As to thermistors Th 1 and Th 2, they are connected in series across the supply. These two thermistors are of equal value and constitute two adjacent branches of a Wheatstone Bridge. The two other branches of the bridge are determined by a voltage divided supply furnished on the potentiometer P1 which is connected across the supply by means of three resistances R5, R6 and R7 in series therewith.

The junction point B of thermistors Th 1 and Th 2 is connected to the base of a transistor amplifier T2, of the type PNP, of which the emitter is connected to the voltage divider supply ultimately furnished by transistor T1. The deviation, due to temperature, of this transistor T2 is compensated by a thermistor Th 3 connected in parallel with the resistance R6.

The collector of transistor T2 is connected directly to the base of a second transistor amplifier T3, of the type NPN, of which the collector is connected to the potential + E by a fixed resistance R8, and of which the emitter is connected to the center tap M by a resistance R9. A resistance R10 is also connected between the base and emitter of this transistor T3.

The monostable multivibrator which comprise the circuit 51 is essentially comprised of two transistors T4 and T5, of type NPN, of which the emitters are directly connected to the zero or reference level of the supply. The base of transistor T4 is connected to the emitter of transistor amplifier T3 by means of a resistance R11, whereas its collector is connected to the base of transistor T5 by a resistance R12 in series with a condenser C2. A condenser C3 is also connected between the collector of transistor T5 and the base of transistor T4.

The collector of transistor T4 is moreover connected to potential + E of the supply by means of a potentiometer P2 in series with the heat compensating resistor R of the sensing means 29. As to the collector of transistor T5, it is connected to the potential + E by a single resistance R13. Finally, the base of T5 is connected to potential + E by a potentiometer P3.

The measuring circuit 52 first comprises three resistances R14, R15 and R16, connected in series between the one of the posts of milliammeter 53 and the junction point G of the resistance R with the collector of transistor T4. The junction point of resistors R14 and R15 is connected to potential + E by a filter condenser C4, whereas the junction point of resistor R15 and R16 is connected to this same potential + E by a filter condenser C5. The point G is moreover connected to an extremity of one diode D3 of which the other extremity is connected to potential + E by a condenser C6 and to condenser C5 by a resistance R17. The other post of milliammeter 53 is connected to potential + E by means of a resistance R18 which in reality is a part of the recording circuit 54. In fact, the recorder 55 is connected at one input to this resistance R18 and its other input to a divided voltage supply H connected to potential + E by a resistance R19 and to the zero or reference side of the supply by a resistance R20.

The command circuit 56 is essentially comprised of a transistor T6, of type NPN, of which the base is connected to point G by means of a resistance R21. The collector of this transistor is connected directly to potential + E of the supply, the impulse counter 57 being connected between the emitter thereof and the zero side of the supply. The milliammeter, which as one sees by the following constitutes the flow indicator means of the apparatus, is mounted on the front face of case 4, as shown in FIG. 1. Likewise, there is provided a window 58 on the front face of the case 4, in order to permit the appearance of the indications of the impulse counter 57 which totals the total quantity of the gas consumed.

The apparatus which has been described functions in the following manner:

The gas fluid, which moves along in the interior of the pipeline 6 in the direction indicated by the arrows 14, meets first of all the perforated grill 15 of which the object is to stabilize the eventual turbulences of the fluid. It next meets the metallic screen which diminishes these turbulences and assures at the same time a filtering of large particles likely to be found in suspension in the gas.

Just as has already been said, the gaseous fluid then divides into two different circuits. The major part of the fluid passes directly through the flow divider block 1 by means of the perforated plate 20, while a small part of it is directed into the measuring head 2 by the calibrated delivery pipe 19. The quantity of gas directed into the measuring head depends essentially upon the ratio between the area of the passage of the delivery pipe 19 and the total area of the calibrated perforations 21 in the plate 20. It is sufficient thus to measure the directed flow in order to have the value of the total flow. It is noted moreover that this plate 20 is removable, thus permitting adaptation of the flow divider block to function in nominal flow of the pipeline 6.

The gaseous flow which enters into the measuring head 2 departs from the delivery pipe 19 in a turbulent fashion and circulates firs in the interior of the ring 25 situated within the annular chamber 24. This permits the gas to obtain the ambient temperature t1 of the assembly of the measuring head 2 before entering the interior of the cavity 27 of the sensing device 29 by means of the passages 31 and 39. The fluid then comes swirling into the cavity 35 of the probe 34, fills the annular space between the probe and the ring 36 and discharges again through the passage 38 to go and rejoin, by means of the passage 32 and the discharge orifice 23, the principal flow which passes through the flow divider block.

The permanent heat resistance R1, being connected in parallel with the supply, causes the probe 34 to assume at rest, that is to say, in the absence of gaseous flow, a temperature $t2$ when the assembly of the measuring head is at the ambient temperature $t1$. The difference $t2 - t1$ only depends upon the heating power of the resistance R1 and as this heating power is constant, the difference $t2 - t1$ is likewise constant.

The resistance R2, also being connected in parallel with the supply, heats thus also constantly the probe 45 of the reference device 30. The probe 45 finds itself, consequently, at the same temperature $t2$ as the probe 34.

The flow of gas which passes through the measuring head 2 tends to cool the probe 34 in passing through the cavity 27. On the other hand, the probe 45 is not cooled since the cavity 28 in which it is located is a dead-end and thus does not have the gas flow therethrough. The lowering of the temperature of probe 34 by reference to that of the probe 45 is detected by the thermistor Th 1 which controls then, as will be seen by the following, the passage of a certain current in the heat compensating resistance R. This current is such that the heat developed by resistor R returns the probe 34 to the temperature $t2$. Otherwise stated, the difference of temperature $t2 - t1$ is maintained constant, despite the flow of gas through the measuring head.

The gas entering the cavity 27 at the temperature $t1$ is heated to the temperature $t2$ and thus accumulates a quantity of heat which is the function of its mass or of its flow rate. This quantity of heat is besides proportional to the electrical power dissipated in the resistance R and it is thus proportional to the current flow through this resistance since the latter is delivered by impulses at constant voltage, as one will see by the following. It is sufficient, consequently, to measure this current by means of milliammeter 53 provided for this purpose, to have the instantaneous value of flow of gas delivered into the measuring head. Moreover, as the delivered flow is proportional to principal flow, it is sufficient to calibrate conveniently the milliammeter 53 in order that the latter gives directly the instantaneous value of the total flow of gas passing through the pipeline 6.

However, in order that the ratio between the delivered flow and the principal flow should be perfectly constant, it is necessary that the delivery pipe 19 be sufficiently small that the gas pressure drop which it causes is large by comparison to that caused by the remainder of the path through the measuring head.

It is likewise convenient to notice that the gas never has time to rigourously assume the temperature $t2$. In fact, the gas assumes a temperature which depends theoretically on the flow. Moreover, the gas has two possibilities of advancing through the cavity 27. For the small flows, the gas flows in a laminar discharge which goes directly out by the passage 38 without coming to whirl in the cavity 35 of the probe. The surface of heat exchange is thus smaller and this compensates the temperature for a time of contact which is relatively long. On the other hand, for the large flows, the gas has a turbulent discharge and swirls into the cavity 35 before flowing out to the passage 38. The surface of heat exchange is thus greater and this compensates for a time of contact which is relatively short. There is obtained thus a linear response between the value of flow and the indication given by the milliammeter 53. Moreover these two possibilities of advancement of gas through the cavity 27 permit compensation for the slight distortions due to the dissipation of heat of the sensing means 29 which is not precisely the same in repose and circulation of gas.

In the absence of the hollow ring 25, the gas is able to take the temperature t1 simply by contact with the annular chamber 24. The presence of the hollow ring 25 becomes useful following periods where the measuring head 2 changes temperature. In this case, the probe 34 follows the changing of temperature with a phase shift in the temperature as a result of its thermal isolation. This hindering phenomena is compensated by the fact that the gas in penetrating into the head 2 takes the temperature $t1$ in the interior of the ring 25 of which the mass and thermal isolation are such that its temperature changes with the same phase shift as the probe 34.

The operation of the associated electronic circuit, referring more particularly to the schematic of FIG. 5, will now be explained. As one sees from the following, the transistor T1 of the supply 49 functions at a constant voltage. It can thus be considered that the positive potential $+E$ of its emitter is perfectly stabilized.

The reference means 30 is geometrically and thermally perfectly identical to the sensing device 29, notably by the presence of the provisional resistance P in the probe 45, at the place of the resistance R of the probe 34. Consequently, the middle point B of the connection of the bridge constituted by the two thermistors Th 1 and Th 2 is not affected by variations of the temperature of the assembly or the measuring head. In fact, if the ambient temperature varies, for example increases, the temperature of the sensing device increases in the same proportion as that of the reference device and the bridge remains in equilibrium. The potentiometer P1 permits the adjustment to zero of the output of the bridge at rest.

As indicated above, the passage of a flow of gas through the cavity of the sensing device 29 tends to cool the probe 34. Consequently, the resistance of the thermistor Th 1 varies from that of the thermistor Th 2 of the reference device 30, which causes an unbalance of the bridge. The unbalanced current of the bridge is at first amplified by the transistor T2 for which deviations in temperature are compensated by the thermistor Th 3. This current is thereafter amplified by the second transistor T3.

The resistors R9 and R10 have for their purpose the maintenance in the transistor T2 of a collector current not negligible in repose, which permits this transistor to work with a coefficient of amplification sufficiently elevated. As to the resistances R8 and R11, they operate as current limiting resistances to prevent damage to the transistor 23 in the case of a great unbalance of the bridge. The unbalanced current of the bridge, amplified by the transistors T2 and T3, controls then the functioning of the monostable multivibrator of circuit 51.

This monostable multivibrator, constituted by the transistor T4 and T5, is in a stable state when the potential of the base of T4 is negative or near zero. In this case, the transistor T4 is in a nonconductive state or blocking. The current in the heat compensating resistor R is null and the potential of point G is thus equal to $+E$. The transistor T5, of which the base is supplied by the potentiometer P3 is thus conductive and maintains in the resistance R13 a current which is such that the potential of its collector is very low.

When the bridge is unbalanced, the current amplified by the transistors T2 and T3 increases the potential of the base of T4 and the base current of the latter, amplified, commences to lower the potential of point G. This lowering of potential is transmitted to the base of T5, by means of the condenser C2, and it causes an increase in the potential of the collector of this transistor. This last increase of potential is also transmitted to the base of T4 by the condenser C3 and entails by cummulative effect, unblocking of transistor T4 and blocking of transistor T5. The resistance R thus provides its maximum voltage drop $+E$, assuming that the potentiometer P2 is set at zero resistance. With this changing state of the multivibrator, the condenser C2 will have accummulated a negative charge $-E$ and the collector of transistor T5 will be raised to potential $+E$.

This state, called unstable, lasts the time of the discharge of condenser C2 into the potentiometer P3. After that, the transistor T5 begins again to conduct through the resistance R13, which causes a reduction of the potential of its collector. This reduction of potential is transmitted by C3 to the base of transistor T4 which then finds itself once again blocked and the multivibrator returns again to its initial, stable state. This cycle recommences as soon as the current issued from transistor T3 has discharged the condenser C3.

One sees thus that the resistance R will pass a series of current impulses, the frequency of which will increase with an increase in the current issued from transistor T3, that is to say, as the unbalance of the bridge increases. FIG. 6 represents, by way of example, the change of the potential at point G of circuit 51, as a function of time and in terms of its amplitude A. The curve 59 (FIG. 6) represents the change of this potential in the case of a small flow and the curve 60 in the case of a large flow. Thus, there is plotted a series of negative impulses 61, the amplitude of which is equal to E and the frequency of which increases with the flow. The duration of these impulses is determined by the time constant C2, P3.

The voltage impulses appearing at the point G of the circuit 51 creates, in the circuit R14, R15, R16, 53, R18, a certain current which, filtered by the condensers C4, C5, give in the milliammeter 53 a useful current practically continuously proportional to the frequency of these impulses. The heat dissipated by the heat compensating resistance R is also proportional to this frequency. The indications of the milliammeter 53, conveniently calibrated, represent the instantaneous value of the gas flow passing through the pipeline 6.

In fact, in the assembly shown, weak flows result in a slight contraction of the scale The latter is compensated by the diode D3 which, under the impulses of G, charges capacitor C6 which rapidly attains the charge $+E$ to remain blocking at this value for the higher flows. The condenser C6 in discharging slowly into resistances R17 and R16, introduces into the milliammeter 53 a correction which is thus particularly apparent for weak gas flows.

The potentiometer P2 permits, at the time of calibration of the apparatus, compensation for small differences which may exist between different measuring heads 2 or connecting cables 3. This also permits adaptation of the apparatus to a gas for which the thermal conductivity would be conditioned to a different variation of $t2-t1$.

The voltage impulses appearing at point G of the circuit 51 are amplified by the transistor T6 of the control circuit 56. This transistor is connected in the common collector mode and the impulse counter 57 is connected to the emitter thereof. Under these conditions, the output of transistor T6 is in opposite phase to that of transistor T4 of the monostable multivibrator. In consequence, as the counter 57 consumes practically the same current as the compensating heater resistor R, the total current delivered by the stabilized supply 49 will be practically constant, which contributes to a perfect stabilization of the regulated voltage E.

The counter 57 registers the number of impulses appearing at the point G and and totals also the total quantity of gas traveling through the pipeline 6. The potentiometer P3 determines the duration of these impulses and thus allows adjustment of the indications of the counter 57 as a function of those given by the milliammeter 53.

The current passing through the milliammeter 53 gives, at the terminals of the resistance R18, a voltage capable of controlling the counter 55. However, it is seen that this recording is not absolutely indispensable. In the case where it is used, it may be provided for in the measuring case 4 by a flexible cable provided for this purpose.

In fact, the base current of transistor T6 causes in the resistance R a small lowering of voltage drop which distorts the zero point. For the milliammeter 53, the latter can be adjusted for by resetting to zero mechanically. For the recorder 55, the zero point may be adjusted in selecting its control voltage, not only on the resistance R18, but also on the supply to the potentiometer H, for which the potential is very near to + E for the value of resistor R19 is very small, compared to that of resistor R20.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. Apparatus for counting and measuring the flow of a gaseous fluid in a pipeline by measuring the quantity of heat necessary to raise the temperature of a given quantity of the fluid, comprising a sensing means disposed in the gaseous flow and a reference means disposed in a dead-end cavity containing the gaseous fluid in a manner to be sensitive to fluid temperature but insensible to the flow of this fluid, in which each of the sensing means and reference means comprises a heat resistor for continually heating the adjacent fluid in order to elevate its temperature to a given quantity and a detection element sensitive to the temperature, the sensing means comprising also a heat compensating resistor, means responsive to a difference between the temperatures of the two detection elements for controlling the amount of current passing through said heat compensating resistor so as to cause the heat compensating resistor to maintain the said elevation of the temperature of the fluid flowing past said sensing means, and means for measuring continually the amount of current passing through said heat compensating resistance.

2. Apparatus according to claim 1, including a measuring head having a body, in which the sensing means and the reference means are both disposed in said measuring head, a tubular flow divider block inserted into the pipeline through which flows the gaseous fluid for which it is desired to measure flow, said flow divider block being fixed to the measuring head body and communicating with the measuring head, on the one hand by an entry orifice for applying fluid to the measuring head and on the other hand by a discharge orifice by which the gas flow directed into the measuring head rejoins the principle flow, the entry orifice being furnished with a calibrated port, a removable transverse plate provided with calibrated perforations located in the flow divider block between the entry orifice and discharge orifice.

3. Apparatus according to claim 2, including means defining an annular chamber in the body of the measuring head, the entry orifice of said directed gas flow opening into said annular chamber, said gas flowing in said annular chamber before reaching said sensing and reference means, the calibrated port associated with the entry orifice being very small so that the directed gas flow is agitated to a turbulent movement in said chamber.

4. Apparatus according to claim 3, including a hollow ring, thermally insulated, disposed in the interior of the annular chamber, so that the fluid takes the temperature of this ring, said ring having the same thermal phase shift as the probe of the sensing means.

5. Apparatus according to claim 4, in which the cavity of the ring communicates at its lower portion with a first dead-end cavity in which is disposed the reference means and with a second similar cavity in which is disposed the sensing means, this second cavity also communicating at its upper portion with a conduit connected directly to the delivery orifice of the directed gas flow.

6. Apparatus according to claim 5, in which the interior walls of the two cavities, in which are respectively disposed the reference means and sensing means, are coated with a thermal insulating material, such as plastic material.

7. Apparatus according to claim 1, including a measuring head incorporating said dead end cavity and further incorporating a through flow cavity, in which the reference means and the sensing means are essentially comprised of two identical metallic probes each in the form of a bell, said reference means probe being located in said dead end cavity and said sensing means probe being located in said through flow cavity, said bells each having a recess containing a metallic alloy into which are respectively received the heating resistor and the detecting element for the reference means, and the heating resistor and the detecting element and the heat compensating resistor for the sensing means, a provisional resistance, of the same nature as the heat compensating resistor of the sensing means, being also inserted into the recess of the probe of the reference means.

8. Apparatus according to claim 1 in which the two detecting elements sensitive to the temperature of the gas flow are comprised of thermistors, said difference responsive means including means connecting said thermistors in two adjacent branches of a Wheatstone bridge, a monostable multivibrator supplying the heat compensating resistor of the sensing means, and means for amplifying the unbalance of the bridge and controlling the functioning of said monostable multivibrator, said means for continual measuring of the current passing through the heat compensating resistor comprising a milliammeter and a filter circuit connecting same in parallel with said heat compensating resistance.

9. Apparatus according to claim 8, including an impulse counter, controlled by the monostable multivibrator and acting as a total counter by integration of the fluid flow.

10. Apparatus according to claim 9, including an electrical supply and in which the counter has a current consumption equivalent to that of the heat compensating resistor and is supplied current by said supply in phase opposition to said heat compensating resistor in a fashion to assure the constant loading of said supply and in proportion to the flow of gaseous fluid.

* * * * *